(12) United States Patent
Desai et al.

(10) Patent No.: US 9,587,794 B2
(45) Date of Patent: Mar. 7, 2017

(54) HEADLAMP ASSEMBLY WITH MULTIPLE HIGH ASPECT RATIO LENSES

(71) Applicant: Ford Global Technologies, LLC, Dearborn, MI (US)

(72) Inventors: Ketan K. Desai, Farmington Hills, MI (US); David A. Brown, West Bloomfield, MI (US); Li Yan, Troy, MI (US); Stephen Kenneth Helwig, Farmington Hills, MI (US); Sleiman N. Abdelnour, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 324 days.

(21) Appl. No.: 14/283,614

(22) Filed: May 21, 2014

(65) Prior Publication Data

US 2015/0338043 A1    Nov. 26, 2015

(51) Int. Cl.
*F21S 8/10* (2006.01)
*B60Q 1/00* (2006.01)

(52) U.S. Cl.
CPC .......... *F21S 48/115* (2013.01); *B60Q 1/0041* (2013.01); *F21S 48/1104* (2013.01); *F21S 48/1159* (2013.01); *F21S 48/125* (2013.01); *F21S 48/1266* (2013.01); *F21S 48/1388* (2013.01); *F21S 48/328* (2013.01); *F21S 48/14* (2013.01); *F21S 48/1742* (2013.01)

(58) Field of Classification Search
CPC .. F21S 48/115; F21S 48/1104; F21S 48/1159; F21S 48/1266; F21S 48/1388; F21S 48/328; F21S 48/125; F21S 48/14; F21S 48/1742; F21S 48/1216; F21S 48/1258; F21S 48/2281; B60Q 1/0041; F21V 7/0025; F21V 7/0083; F21V 5/048; F21V 5/00731
USPC ......... 362/516–517, 520–522, 525, 545–547
See application file for complete search history.

(56) References Cited

U.S. PATENT DOCUMENTS

| | | | |
|---|---|---|---|
| 2005/0068787 A1* | 3/2005 | Ishida | B60Q 1/14 362/538 |
| 2005/0207164 A1 | 9/2005 | Holtz et al. | |
| 2008/0112180 A1* | 5/2008 | Okada | F21S 48/1154 362/518 |
| 2014/0036523 A1* | 2/2014 | Thullier | F21S 48/1216 362/516 |

(Continued)

FOREIGN PATENT DOCUMENTS

| | | |
|---|---|---|
| DE | 202004001269 U1 | 4/2004 |
| DE | 10311688 A1 | 9/2004 |
| DE | 102012001499 A1 | 8/2013 |

*Primary Examiner* — Jason Moon Han
*Assistant Examiner* — Omar Rojas Cadima
(74) *Attorney, Agent, or Firm* — Jason C. Rogers; Brooks Kushman P.C.

(57) ABSTRACT

A headlight assembly including a plurality of low-beam modules and a plurality of high-beam modules are enclosed in a housing. The low-beam modules include a top reflector disposed above a low-beam LED light source that projects a height limited first beam of light through the low-beam lens. The high-beam modules include a bottom reflector disposed below a high-beam LED light source that projects a second beam of light through a high-beam lens above the first beam of light. Each module has an aspect ratio of 2:1 with the height of the lens being twice the width of the lens.

6 Claims, 4 Drawing Sheets

(56) References Cited

U.S. PATENT DOCUMENTS

2014/0321147 A1* 10/2014 Todaka .................. F21S 48/12
362/516
2015/0036354 A1* 2/2015 Adams .................... F21V 5/007
362/311.02

* cited by examiner

HEADLAMP ASSEMBLY WITH MULTIPLE HIGH ASPECT RATIO LENSES

TECHNICAL FIELD

This disclosure relates to a headlight assembly that includes a plurality of modular LED lights that provide low beam and high beam illumination patterns.

BACKGROUND

Vehicles are provided with headlights that illuminate the road in front of a vehicle. The beam pattern of vehicle headlights is subject to safety standards such as Federal Motor Vehicle Safety Standard (FMVSS) 108, ECE regulations and CCC regulations for lighting. This safety standard regulates the height and spread of low-beam headlights and high-beam headlights so that adequate illumination is provided for a driver without blinding drivers of on-coming vehicles.

Light Emitting Diode (LED) lights have been developed for headlight applications because they offer excellent illumination, energy savings, weight savings and longer service life. LED headlights present challenges relating to providing an attractive headlight assembly that also meets relevant safety standards.

This disclosure is directed to the above problems and other problems as summarized below.

SUMMARY

A distinctive headlight assembly having a uniquely shaped clear optical lens is provided for an LED light source. The LED light source and reflectors are coupled to a plastic optical lens that provide light to the lens that has a prescribed focal length. The light is projected and distributed through the lens and to a specific target area of the standards compliant legal beam pattern. The aperture of the LED light source has an aspect ratio of 1:2 width to height to create a distinctive vertical appearance. The aperture of the lens is curved in a horizontal plane and a vertical plane to produce the desired spread pattern. The top and bottom ends of the lens are narrower than the middle portion of the lens.

According to one aspect of this disclosure, a headlight assembly is provided that comprises a housing that encloses a plurality of low-beam modules and a plurality of high-beam modules. The low-beam modules include a top reflector disposed above a low-beam LED light source that projects a height limited first beam of light through a low-beam lens. The high-beam modules include a bottom reflector disposed below a high-beam LED light source that projects a second beam of light through a high-beam lens above the first beam of light.

According to other aspects of this disclosure, three low-beam modules may be assembled to the housing and two high-beam modules may be assembled to the housing at an inboard location relative to the low-beam modules.

The plurality of low-beam modules and the plurality of high-beam modules may be assembled to the housing at an inboard location relative to the low-beam modules. The low-beam modules may further comprise an LED support extending in a horizontal plane that has an upper reflective surface that cooperates with the top reflector to project the height limited first beam of light. The high-beam modules may further comprise an LED support extending in a horizontal plane that has a lower reflective surface that cooperates with the bottom reflector to project the second beam of light.

The upper reflective surface of the plurality of low-beam modules relative to the top reflector may be set at a different height than the height of the upper reflective surface of an adjacent low-beam module. The lower reflective surface of the plurality of high-beam modules relative to the bottom reflector may also be set at a different height than the height of the lower reflective surface of an adjacent high-beam module.

Each low-beam modules may further comprise an LED support extending in a horizontal plane with a plurality of heat sink fins extending downwardly from the horizontal plane. The LED support may have an upper reflective surface that cooperates with the top reflector to project the height limited first beam of light. A light blocker may be disposed between the upper reflective surface and the low-beam lens that limits the height of the first beam of light.

Each high-beam module may further comprise an LED support extending in a horizontal plane with a plurality of heat sink fins extending upwardly from the horizontal plane. The LED support may also have a lower reflective surface that cooperates with the bottom reflector to project the second beam of light.

The low-beam lens and the high-beam lens may have convex inner sides and convex outer sides that are generated about a central axis extending in a projection direction for each of the beams of light. Two lateral portions of each lens are truncated to form a vertically extending lateral side surface of the lens.

According to another aspect of this disclosure, a headlight module is provided that comprises a reflective platform, a light source attached to the platform, a partially parabolic reflector facing the platform and a lens having a convex inner side and convex outer side. The convex inner and outer sides are each generated about a central axis extending in a projection direction. Two lateral portions of the lens are both truncated to form a vertically extending lateral side surface of the lens.

According to other aspects of this disclosure that relates to the headlight module, a height of the lens is greater than a width of the lens. The height of the lens may be more than two times a width of the lens.

The headlight module may further comprise a module housing that is attached to the two lateral portions of the lens, a lower end of the lens and an upper end of the lens. The module housing may enclose the reflective platform, the partially parabolic reflector and the light source. An attachment mechanism may be provided to connect the reflective platform, the partially parabolic reflector and the light source as a unit to the housing within a range of vertical locations relative to the central axis to adjust a light projection direction of the module.

The reflector for a low-beam headlight is disposed above the platform and the light source to project a height limited beam of light through the lens. The reflector for a high-beam headlight is disposed below the platform and the light source to project a beam of light in an upwardly inclined direction through the lens.

According to another aspect of this disclosure, a headlight assembly is provided that comprises a housing, a plurality of low-beam modules and a plurality of high-beam modules. Each of the low-beam modules include a top reflector disposed above a low-beam LED light source that project a height limited first beam of light through a low-beam lens. The high-beam modules include a bottom reflector disposed below a high-beam LED light source that projects a second beam of light through a high-beam lens above the first beam of light. Each of the lenses have a convex inner side and convex outer side that are each generated about a central axis extending in a projection direction. Two lateral portions of the lens are both truncated to form a vertically extending lateral side surface of the lens.

The above aspects of this disclosure and other aspects will be described in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
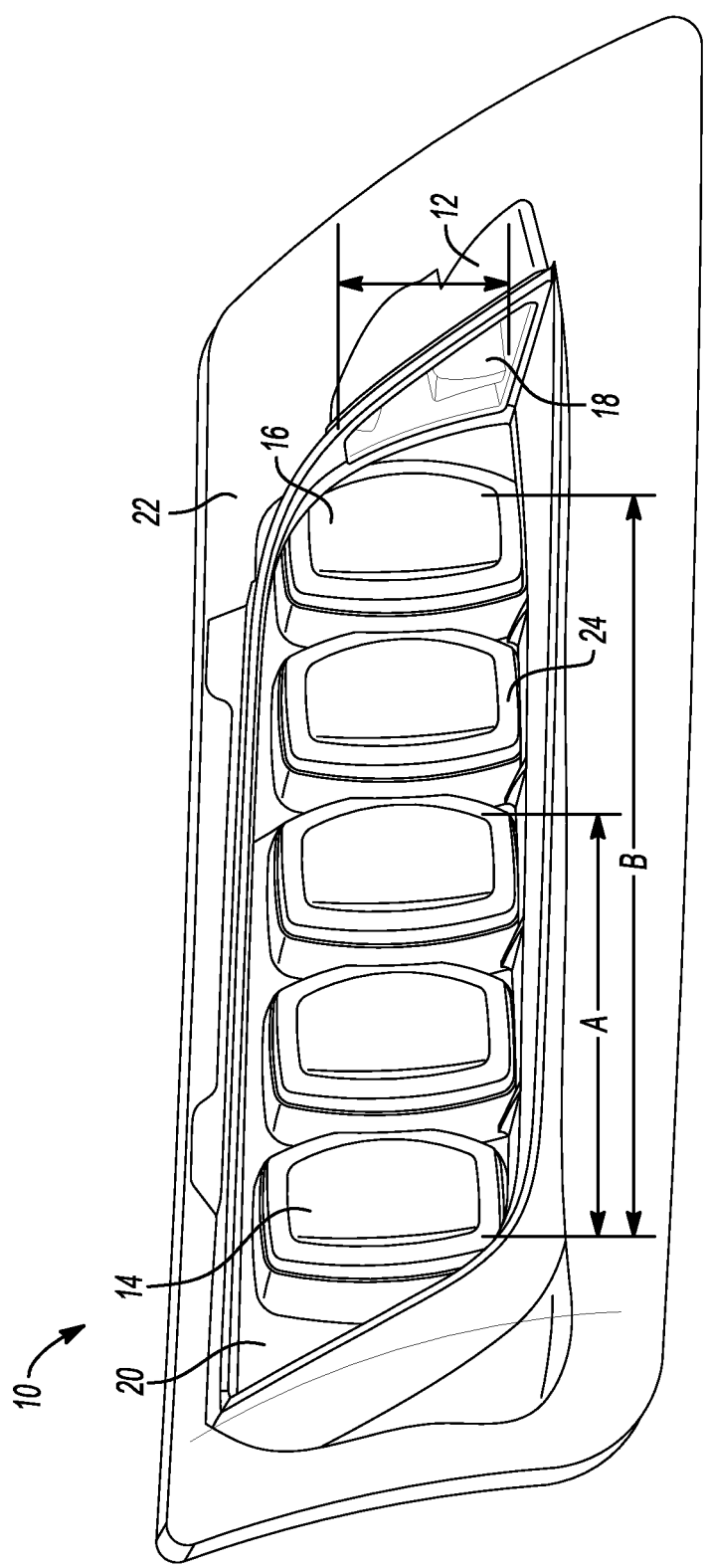
FIG. 1 is a fragmentary front perspective view of the right headlight assembly made according to one embodiment of this disclosure.

Referring to FIG. 1, a headlight assembly 10 for a vehicle 12 is illustrated that is made in accordance with one embodiment of this disclosure. The headlight assembly 10 includes a set of three low-beam modules 14 and a set of two high-beam modules 16. The low-beam modules are disposed outboard of the high-beam modules. Line "A" indicates the modules 14 illuminated in the low-beam mode. Line "B" indicates the modules 14 and 16 illuminated in the high-beam mode. The high-beam modules are closest to the centerline of the vehicle. The headlight assembly 10, shown in FIG. 1, is a right side headlight assembly that is located on the right side of the vehicle in the vehicle direction.

A static bending light module 18 is also included as part of the headlight assembly 10 that is used to project a light in the direction to which the vehicle is turning. The static bending module 18 is disposed inboard of the high-beam module 16. The low-beam modules 14 and high-beam modules 16 are enclosed within a housing 20. The housing 20 is assembled as a unit to the vehicle 12 after being assembled offline as a sub-assembly. The low-beam modules 14 and high-beam modules 16 each include a outer lens 22 through which light is projected and a bezel 24 is provided that extends around the outer lens 22 to provide a finished appearance.

Figure 2:
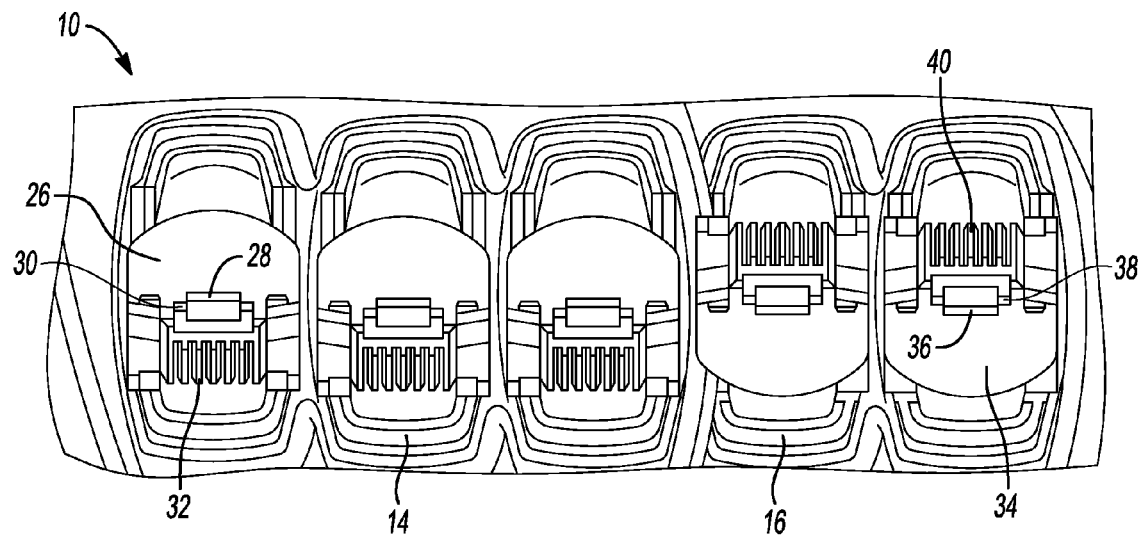
FIG. 2 is a fragmentary front elevation view of the right headlight assembly shown in FIG. 1.

Referring to FIG. 2, the headlight assembly 10 is shown with the lenses and the housing removed to reveal the internal structure of the low-beam modules 14 and high-beam modules 16. The low-beam modules 14 include a top reflector 26 that is disposed above an LED light source 28. The LED light source may include two LED lights that are assembled to a single chip. A reflective platform 30 is provided on which the LED light source 28 is assembled. A plurality of lower heat sink fins 32 extend downwardly from the platform 30 to dissipate heat from the LED light source and may also be used to dissipate heat from a LED power source (not shown).

The high-beam modules 16 include a bottom reflector 34 that is assembled below the LED light source 36. The LED light source 36 includes three LED lights that are assembled to a single chip. The chip is mounted on a reflective platform 38. A plurality of upper heat sink fins 40 are provided above the reflective platform 38 to dissipate heat, as previously described.

It should be noted that the level of the top reflector 26, LED light source 28 and reflective platform 30 is higher on the outermost low-beam module 14 and is lowest on the innermost low-beam module 14. The platform and other parts of the center module are between the level of the platforms on the adjacent modules, as shown in FIG. 2. The two high-beam modules 16, shown in FIG. 2, also have slightly different heights relative to each other. The innermost high beam module has a bottom reflector 34, LED light source 36 and reflective platform 38 that is mounted slightly lower than the outer high-beam module 16. The height of the platforms 30, 38 and the LED light sources 28, 36 and top reflector 26 and bottom reflector 34 are adjusted vertically relative to the outer lens 22 (shown in FIG. 1) to permit the light beam to be adjusted vertically to comply with FMVSS 108. The arrangement of the low-beam module 14 provides a downwardly directed light beam that result in a light projection pattern that will be described below with reference to FIG. 6. The high-beam modules 16 have a bottom reflector 34 that is disposed below the LED light source 36 and reflective platform 38 to create an upwardly directed light beam that creates a pattern in conjunction with the low-beam modules 14, as shown in FIG. 7.

Figure 3:
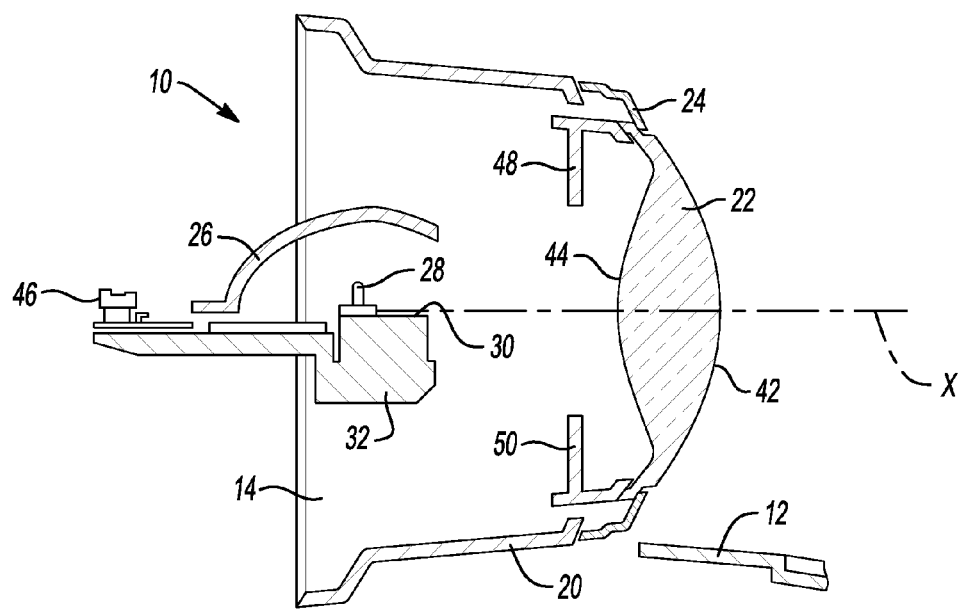
FIG. 3 is a diagrammatic vertical cross-section view of one low beam module of the headlight shown in FIG. 1.

Referring to FIG. 3, a low-beam module 14 is illustrated in greater detail. The headlight assembly 10 is shown assembled to a vehicle 12. The housing 20 is supported by the vehicle 12. The bezel 24 extends between the housing 20 and the outer lens 22. The outer lens 22 includes a front convex surface 42 and a rear convex surface 44. The front and rear convex surfaces 42 and 44 are focused in accordance with FMVSS 108 to project a beam of light below the horizon line. The beam of light created by the LED light source 28 directs light toward the top reflector 26. The light is reflected from the top reflector 26 to the reflective platform 30. The front convex surface 42 and rear convex surface 44 are generated about a central axis X as circular lenses.

A wiring connector, or socket, 46 is shown attached to the platform 30. The platform 30 is shown to be supporting the LED light source 28 and also supporting the top reflector 26. An upper light blocker 48 is provided between the LED light source 28 on the reflective platform 30 and the outer lens 22. The light blocker 48 blocks light from being projected above a desired level as required by FMVSS 108. A lower light blocker 50 blocks light from being projected below a desired level.

The module shown in FIG. 3 is a low-beam module 14. However, it should be understood that the structure of the high beam module 16 is essentially identical, but the bottom reflector 34 and LED light source and reflective platform 38 would be inverted in a high-beam module 16. Note, the height of the platform and the other components is adjusted to direct the light beam in the desired pattern.

Figure 4:
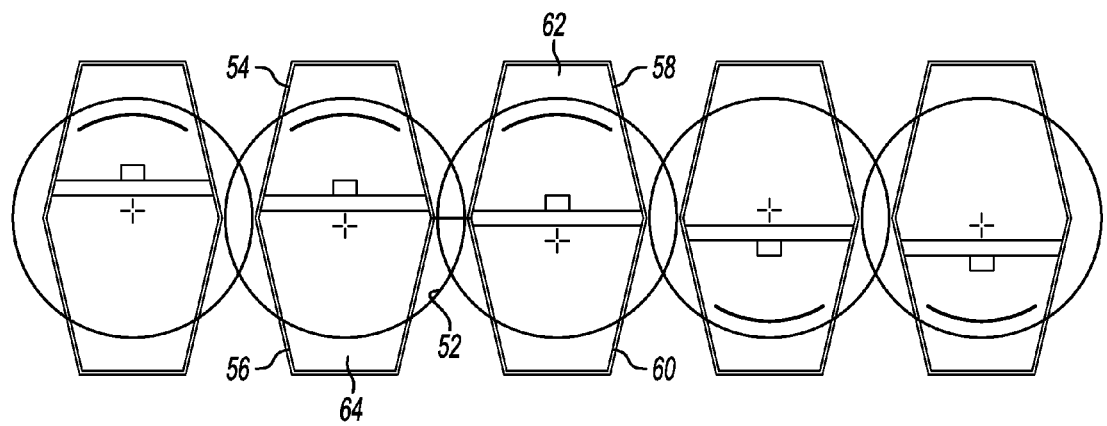
FIG. 4 is a diagrammatic front elevation view of three low beam lenses and two high beam lenses with the lateral sides truncated at vertically extending walls and the LED support platforms at different heights relative to the lenses.

Referring to FIG. 4, a headlight assembly 10 is shown diagrammatically to illustrate the lenses for the low-beam modules 14 and high-beam modules 16. The lenses 22 are a circular lens form 52 that is truncated on the right and left side. An upper right side 54 (in the vehicle direction) and a lower right side 56 define the right side of each lens. An upper left side 58 and a lower left side 60 define the left side of the outer lens 22. An upper extension 62 and a lower extension 64 are provided to create the desired high aspect ratio lens. The lenses are molded in a mold that includes the circular lens form 52 and the right and left sides of the outer lens 22 are molded with the upper extension and lower extension 62 and 64. The aspect ratio of each lens is the ratio of 2:1 with the lens being twice as tall as it is wide for each of the low and high-beam modules 14 and 16.

Figure 5:
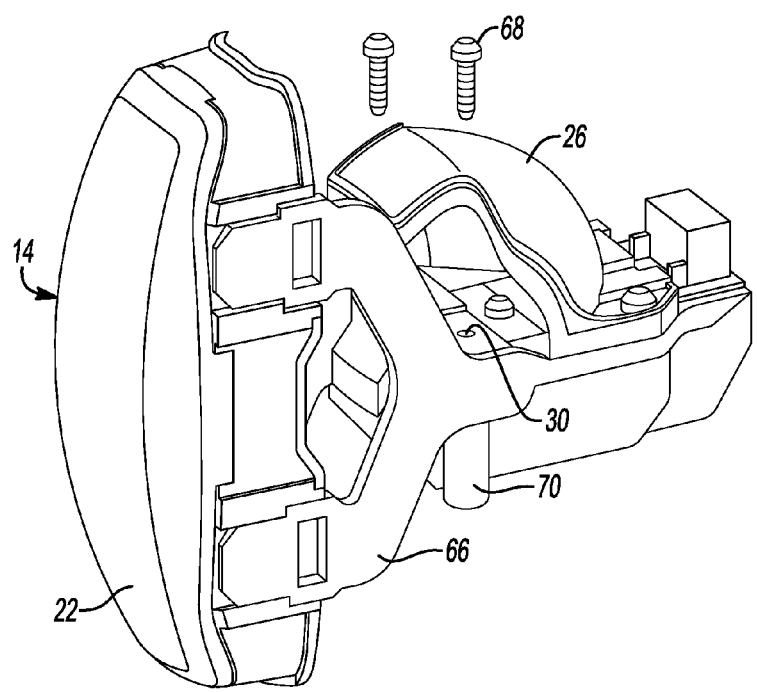
FIG. 5 is a front/side perspective view of one low beam module of the headlight shown in FIG. 1.

Referring to FIG. 5, a low-beam module 14 is shown separated from the headlight assembly 10 (shown in FIG. 1). The low-beam module 14 includes a side bracket 66 that secures the lens to the reflective platform 30 and top reflector 26. A height adjustment fastener 68 is provided to locate the reflective platform 30 and top reflector 26 relative to the outer lens 22. The height adjustment fastener 68 is received in a height adjustment receptacle 70 that may be provided on the reflective platform 30.

Figure 6:
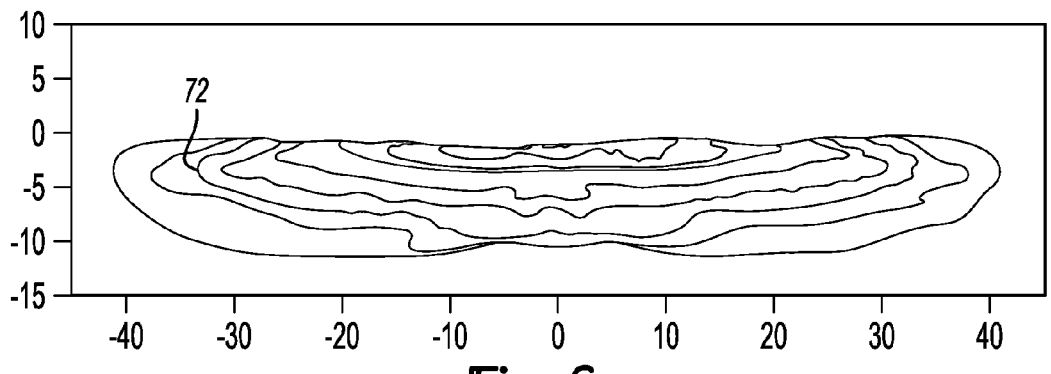
FIG. 6 is a diagrammatic view of a low beam light projection pattern created by the low beam lights only of the headlight assembly.
Figure 7:
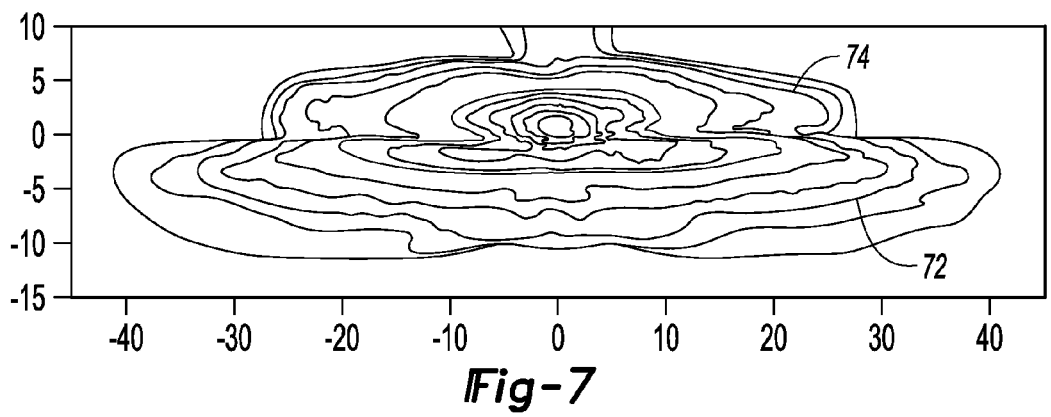
FIG. 7 is a diagrammatic view of a high beam and low beam light projection pattern created by the high beam and low beam lights of the headlight assembly.

Referring to FIG. 6, a low-beam illumination pattern 72 is shown. The low-beam illumination pattern 72 is height limited to not project light above the horizon line that is represented by zero on the Y axis. The spread of the low-beam illumination pattern 72 extends to provide a wide beam in both directions relative to the centerline indicated by the zero on the X axis in FIG. 6.

Referring to FIG. 7, a low-beam illumination pattern 72 and a high-beam illumination pattern 74 are shown together. The low-beam illumination pattern 72 is below the horizon line, or zero, and the high-beam illumination pattern 74 is provided above the horizon line. An area of maximum illumination is provided above the horizon line in the center of the combined illumination pattern 72, 74. The high-beam illumination pattern 74 extends approximately 20° to each side of the centerline and has a maximum height of approximately 5° above the horizon line with intensity less than 5,000 candela.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A headlight assembly comprising:
a housing;
a plurality of low-beam modules assembled to the housing including a top reflector disposed above a low-beam LED light source projecting a height limited first beam of light through a low-beam lens, wherein the low-beam modules further comprise an LED support extending in a horizontal plane and having an upper reflective surface that cooperates with the top reflector to project the height limited first beam of light, wherein the upper reflective surface of the plurality of low-beam modules relative to the top reflector is at a different height than the height of the upper reflective surface of an adjacent low-beam module; and
a plurality of high-beam modules assembled to the housing including a bottom reflector disposed below a high-beam LED light source projecting a second beam of light through a high-beam lens above the first beam of light, wherein the plurality of low-beam modules and the plurality of high-beam modules are assembled to the housing at an inboard location relative to the low-beam modules, wherein the high-beam modules further comprise an LED support extending in a horizontal plane and having a lower reflective surface that cooperates with the bottom reflector to project the second beam of light, wherein the lower reflective surface of the plurality of high-beam modules relative to the bottom reflector is at a different height than the height of the lower reflective surface of an adjacent high-beam module.

2. The headlight assembly of claim 1 wherein three low-beam modules are assembled to the housing and two high-beam modules are assembled to the housing at an inboard location relative to the low-beam modules.

3. The headlight assembly of claim 1 wherein each low-beam module LED support extends in a horizontal plane and includes a plurality of heat sink fins extending downwardly from the horizontal plane.

4. The headlight assembly of claim 3 further comprising a light blocker disposed between the upper reflective surface and the low-beam lens that limits the height of the first beam of light.

5. The headlight assembly of claim 1 wherein each high-beam module LED support extends in a horizontal plane and includes a plurality of heat sink fins extending upwardly from the horizontal plane.

6. The headlight assembly of claim 1 wherein the low-beam lens and the high-beam lens have convex inner sides and convex outer sides that are generated about a central axis extending in a projection direction for each of the beams of light, and wherein two lateral portions of each lens are truncated to form a vertically extending lateral side surface of the lens.

* * * * *